United States Patent
Mueller et al.

(10) Patent No.: US 7,668,190 B1
(45) Date of Patent: Feb. 23, 2010

(54) METHOD FOR SUPPORTING MULTIPLE DEVICES ON A HIGH SPEED PHYSICAL LINK

(75) Inventors: Peter D. Mueller, Fair Oaks, CA (US); Mark N. Fullerton, Austin, TX (US); Nir Nossenson, Kfar-Saba (IL)

(73) Assignee: Marvell International Ltd. (BM)

( * ) Notice: Subject to any disclaimer, the term of this patent is extended or adjusted under 35 U.S.C. 154(b) by 741 days.

(21) Appl. No.: 10/749,942

(22) Filed: Dec. 31, 2003

(51) Int. Cl.
*H04J 3/17* (2006.01)
(52) U.S. Cl. .................. 370/433; 370/439; 370/447; 700/3; 710/100
(58) Field of Classification Search .............. 370/433, 370/438, 439, 445, 447; 700/2, 3; 710/110, 710/309
See application file for complete search history.

(56) References Cited

U.S. PATENT DOCUMENTS

| | | | | |
|---|---|---|---|---|
| 5,434,983 A | * | 7/1995 | Yaso et al. | 710/110 |
| 5,530,875 A | * | 6/1996 | Wach | 710/264 |
| 5,754,780 A | * | 5/1998 | Asakawa et al. | 709/208 |
| 5,784,582 A | * | 7/1998 | Hughes | 710/117 |
| 5,907,689 A | * | 5/1999 | Tavallaei et al. | 710/110 |
| 6,092,137 A | * | 7/2000 | Huang et al. | 710/111 |
| 6,279,067 B1 | * | 8/2001 | Callway et al. | 710/260 |
| 7,058,741 B2 | * | 6/2006 | Iwata et al. | 710/110 |
| 2004/0236879 A1 | * | 11/2004 | Croxford et al. | 710/48 |
| 2007/0101033 A1 | * | 5/2007 | Chen et al. | 710/241 |

* cited by examiner

*Primary Examiner*—Jayanti K Patel
*Assistant Examiner*—Bo Hui A Zhu

(57) ABSTRACT

In some embodiments, a method for supporting multiple devices on a high speed physical link may be described. An embedded device may assert a link request pin to request to transmit data on a multi-point communications link that may serve a plurality of embedded devices. A controlling device may receive the link request signal. When the controlling device finishes sending data on the link, it may address the plurality of embedded devices in a round robin format and may determine which device asserted the link request pin. The embedded device that asserted the link request pin may send an acknowledgement signal to the controlling device when it is addressed.

51 Claims, 3 Drawing Sheets

METHOD FOR SUPPORTING MULTIPLE DEVICES ON A HIGH SPEED PHYSICAL LINK

BACKGROUND OF THE INVENTION

There are numerous applications for embedded microprocessor devices. These applications may include various technologies for cellular telephones, notebook computers, handheld computers, personal digital assistants, automobiles, appliances and other consumer products. For example, a cellular phone may have an embedded general applications processor and a baseband processor. Typically, the applications processor may manage database applications while the baseband processor may support a communications platform such as General Packet Radio Service (GPRS) or Code Division Multiple Access (CDMA).

The number of microprocessors that are being embedded into devices, particularly handheld devices, is increasing to provide customers with additional features. These new features have increased the types and amounts of data embedded processors exchange with other microprocessors, peripherals and/or external servers. For example, embedded microprocessors now exchange everything from command and control data to large databases and streaming data for voice and video communications.

In the past, if there was a need for inter-processor communications, these communications could be accomplished through a low-speed physical link, such as a serial interface, which may have limited quality of service (QoS) and data reliability management. However, today's designers are integrating new features into handheld devices such as CMOS digital imaging, World Wide Web (WWW) access and multimedia processing. In addition, handheld devices are also supporting more recent communications platforms such as Wideband Code Division Multiple Access (WCDMA), IEEE 802.11, Bluetooth® and the like for next generation wireless applications. This expansion of capabilities has led to the emergence of handheld devices that are structured more like personal computers. For example, these devices might include an applications subsystem for implementing various database and multimedia applications and then separate communications subsystems for implementing wireless communications.

Separate processor subsystems have necessitated an increased focus by circuit designers on high-speed processor to processor communications. Recently, particular attention has been paid to providing a high-speed, reliable standard for a communications interface between an embedded general purpose applications processor and a baseband processor. One example of a high-speed processor to processor communications interface is Intel® Corporation's Mobile Scalable Link® (MSL) technology. Factors considered for an inter-processor communications standard may include high inter-processor data transmission rates, scalability for increasing bandwidth, QoS, security, and the elimination of data exchange bottlenecks. Unlike the typical personal computer, however, these devices have to be designed with severe packaging and power consumption constraints in mind.

BRIEF DESCRIPTION OF DRAWINGS

Embodiments of the present invention may be understood more fully from the detailed description given below and from the accompanying drawings of embodiments of the invention which, however, should not be taken to limit the invention to the specific embodiments described, but are for explanation and understanding only.

DETAILED DESCRIPTION OF THE INVENTION

In the following detailed description of the present invention numerous specific details may be set forth in order to provide a thorough understanding of embodiments of the present invention. However, it will be apparent to one skilled in the art that the present invention may be practiced without these specific details. In other instances, well-known structures and devices may be shown in block diagram form, rather than in detail, in order to avoid obscuring the present invention.

Reference in the specification to "one embodiment" or "an embodiment" may mean that a particular feature, structure, or characteristic described in connection with the embodiment may be included in at least one embodiment of the invention. The appearances of the phrase "in one embodiment" in various places in the specification are not necessarily all referring to the same embodiment.

The apparatuses presented herein are not inherently related to any particular device, circuit or other apparatus. Various general purpose devices or circuits may be used with the apparatuses in accordance with the teachings herein, or it may prove convenient to construct a more specialized apparatus or device to use in conjunction with the apparatuses. In addition, embodiments of the present invention may not be described with reference to any particular device, circuit or other apparatus. It will be appreciated that a variety of devices, circuits or other apparatuses may be used in conjunction with the apparatuses as described herein.

Figure 1:
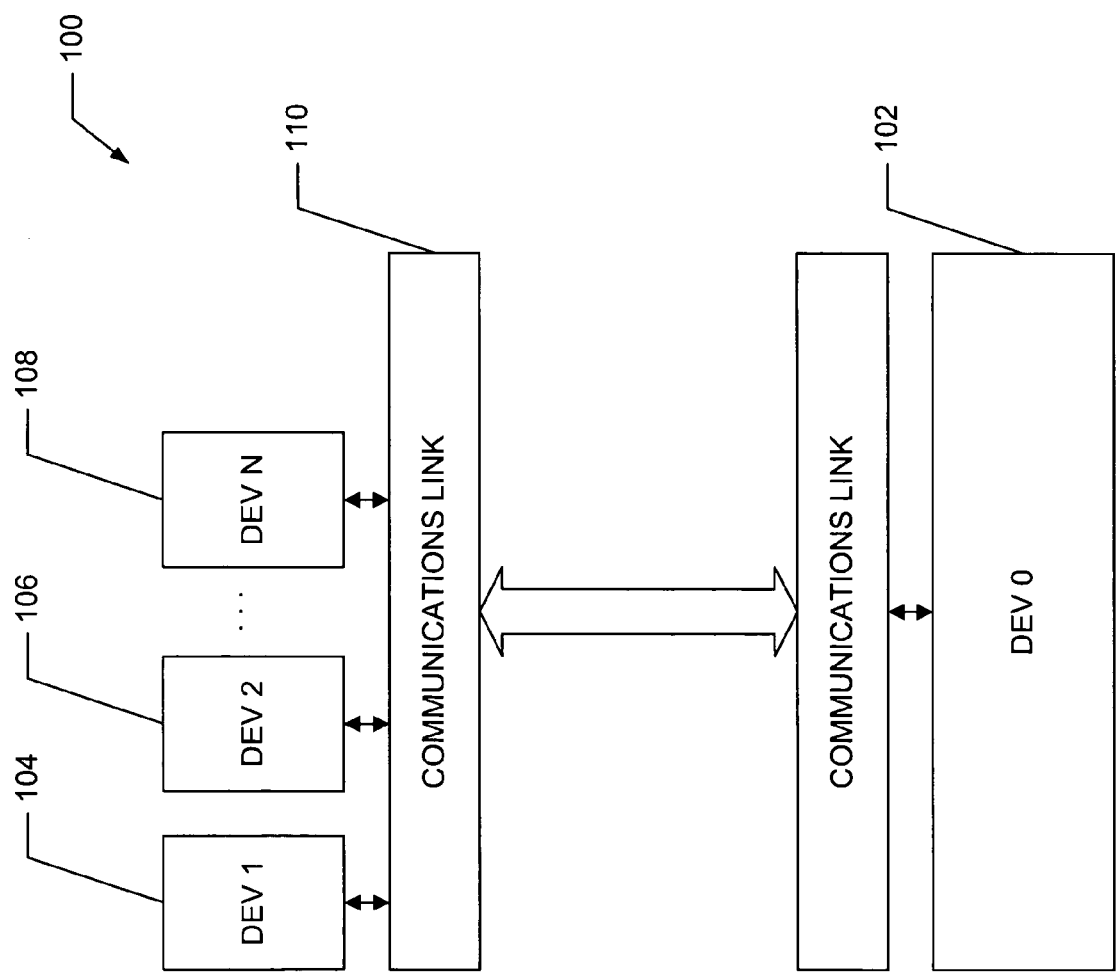
FIG. 1 illustrates an inter-processor communications link.

Referring now to FIG. 1, an illustration of a system 100 for multi-point communications is presented. Device '0' 102 may be an embedded processor device which may be, for example, a general applications processor for a radio telecommunications device, such as, but not limited to, a radio telephone or a personal digital assistant (PDA). In one embodiment, a general applications processor may be focused on running database applications such as World Wide Web surfing or multimedia processing. Device '1' through device 'N', 104, 106 and 108 respectively, may be embedded processor devices. These embedded devices may include a general applications processor device, a baseband processor device or other general or dedicated processor devices. For example, the system 100 may represent a baseband processor to applications processor interface for a "smart" radio telephone medium. The smart telephone may include separate applications and communications subsystems, wherein, for example, the applications subsystem might be represented by device '0' 102 and various communications subsystems may by represented by devices '1'-'N', 104 to 108 respectively. In one embodiment, the communications subsystems may include multiple baseband processors such as CDMA processors, WCDMA processors, Bluetooth processors, IEEE 802.11 processors and/or other baseband processor devices. In one embodiment, the communications subsystems may include processors for multiple cellular basebands for supporting various cellular transmission standards. In another embodiment, the devices '1'-'N', 104 to 108 respectively, may also comprise processors for hardware accelerator applications, audio code/decode (CODEC) applications, digital signal processing and/or other applications.

In one embodiment, the multi-point, inter-device communications link 110 may be a data link between a plurality of applications and/or communications subsystems. For example, the link 110 may be a dedicated and optimized high speed interface that allows for multi-point data transmissions between a plurality of embedded applications processor devices. One inter-device communications link 110 that may be suitable for performing the functions described herein is the Intel® Corporation's Mobile Scalable Link® (MSL) technology, however, this link is not limited to such inter-device communications link. As such, other inter-device communications links capable of, for example, one hundred megabit/second or greater data rates and for providing a common, multi-point interface for communicating between embedded applications processors, may be suitable for performing the functions herein.

Figure 2:
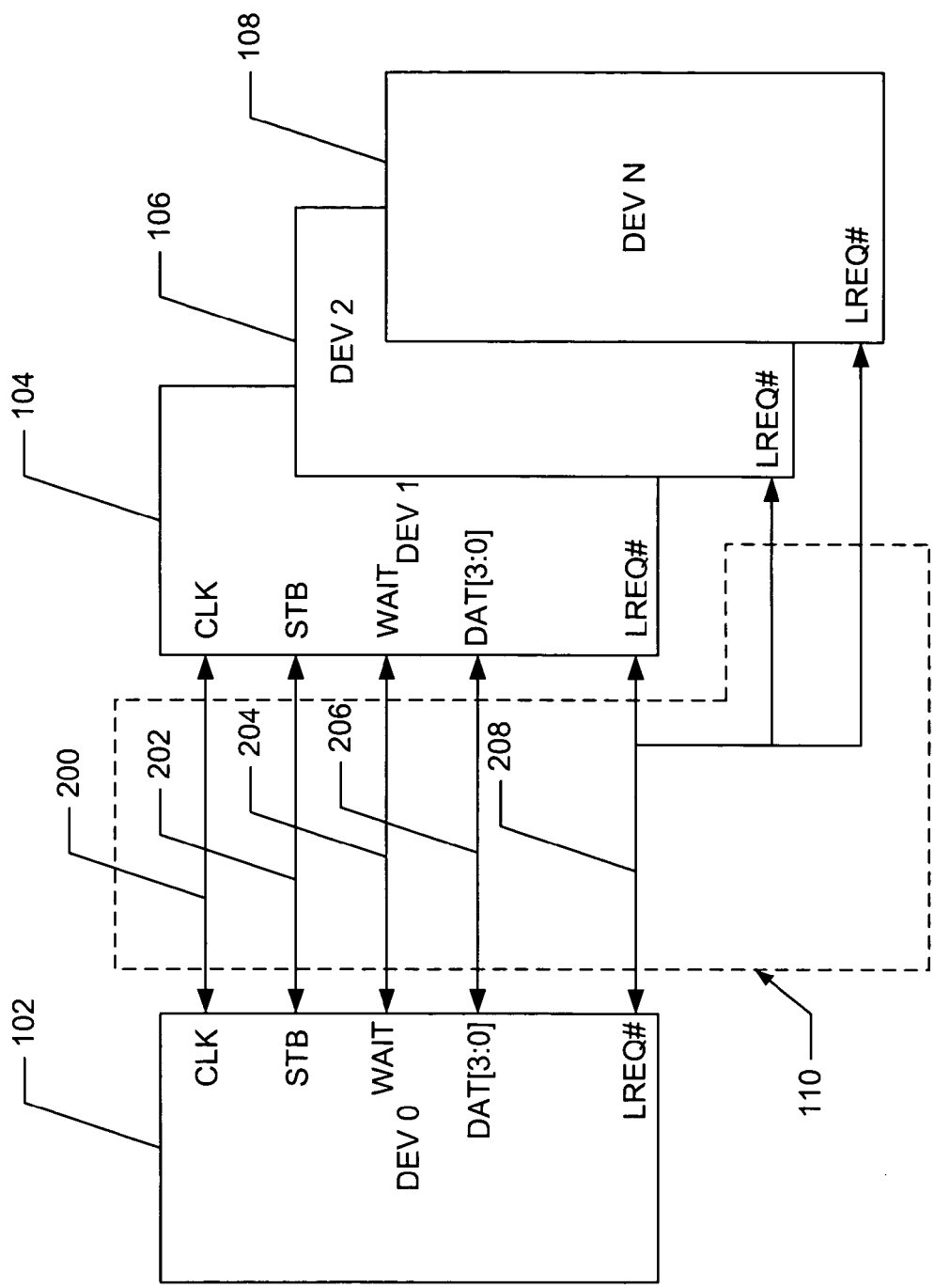
FIG. 2 illustrates an inter-processor communications link according to one embodiment of the present invention.

FIG. 2 illustrates a multi-point, inter-device communications link 110 according to one embodiment of the present invention. In one embodiment, device '0' 102 may represent an applications processor. For example, device '0' 102 may initially control the flow of data on the link 110 between the embedded devices or may be operable to configure the other embedded devices. The clock pin 200 may be activated to control the timing for a data transmission on the link 110. For example, in a handheld device where power conservation may be an issue, the clock 200 may be driven only when data is being transferred on the link 110. Strobe 202 may be activated to frame a data packet so as to tell a receiving device when a packet is coming and the channel that it will be transmitted over. For example, when the strobe 202 is activated, the receiving device may know to look at the data pins 206, which may tell the receiving device what channel the data may be being transmitted on. For a multi-point communications link 110 for example, the activation of the strobe 202 followed by a device identification indicated by the data pins 206 may be used to transmit which device out of the plurality of embedded devices may be targeted to receive data.

The wait pin 204 may be a data flow control mechanism which the receiving device may assert when it may not accept any more data, thus it may prevent an overrun condition. When the wait pin 204 goes inactive, the sending device may know that it may resume transmitting data to the receiving device. The wait pin 204 may also be used as an acknowledgement signal for a device requesting to transmit data on the link 110, as described below.

The link request (LReq) pin 208 may be an arbitration pin that may be shared between the plurality of embedded devices operable to utilize the link 110. Packaging constraints in a handheld device, for example, may make it advantageous to reduce pin count by multiplexing the LReq pin 208 between the plurality of embedded devices. In another embodiment, each device operable to utilize the link 110 to transmit data may have a dedicated LReq pin 208.

In one embodiment, in order to avoid data corruption, only one device may be permitted to transmit data on the link 110 at a time. Therefore, when a device activates the LReq pin 208, an arbitration may begin to determine the requesting device and may handoff permission to transmit data on the link 110 from the controlling device to the requesting device.

Figure 3:
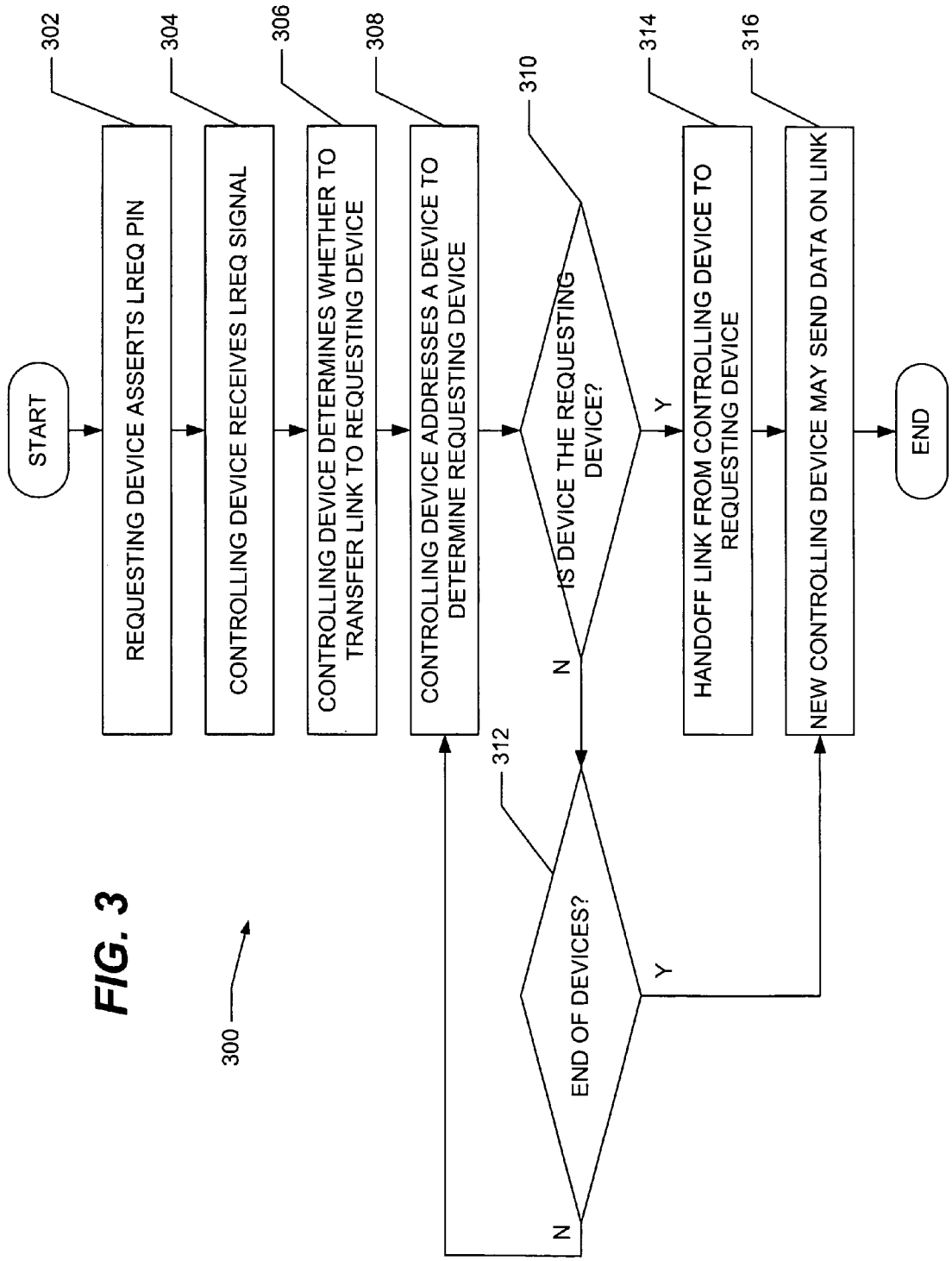
FIG. 3 shows a flowchart illustrating a possible mode of operation of an embodiment of the present invention.

FIG. 3 illustrates a flowchart 300 representing one embodiment of the present invention. In operation, after a start up phase in which a device having permission to transmit data on the link 110 may be established, at 302, a device that may wish to transmit data on the link, or a requesting device, may activate the LReq pin 208. When the LReq pin 208 is activated, the device permitted to transmit on the link, or the controlling device (e.g., sometimes referred to as a "controller" or an "embedded controlling device"), may receive the activated LReq signal at 304 and may begin an arbitration cycle. Alternatively, the controlling device may determine that it does not want to relinquish control of the link 110, for example, if it is still in the process of transmitting data. The controlling device may wait until it is finished transmitting data to begin an arbitration cycle. In one embodiment, the requesting device may not have to reactivate the LReq pin 208 if the controlling device does not immediately begin an arbitration cycle. The LReq pin 208 may stay activated until it is acknowledged by the controlling device.

When the controlling device determines that it is ready to transfer permission to transmit data on the link to another device at 306, the controlling device may address the plurality of embedded devices and may determine which device activated the LReq pin 208 for control of the link 110 at 308. At 310, the controlling device may address each of the plurality of embedded devices and may determine which device activated the LReq pin 208 until it receives an acknowledgement signal. In one embodiment, the controlling device may address the plurality of embedded devices utilizing a round-robin method. For example, if device '1' 104 is the controlling device, it may address device '2' 106 first by activating the strobe pin 202 followed by the device ID for device '2' 106. If device '2' 106 is the requesting device, it may send a confirmation signal to the controlling device. In one embodiment, the requesting device may activate the wait pin 204 when it is addressed by the controlling device as a confirmation signal. If device '2' 106 is not the requesting device, the controlling device may determine whether there are additional embedded devices at 312 and may then address each one in turn 308 and may determine if the addressed device is the requested device. For example, if device '2' 106 is not the requesting device, the controlling device may address a device '3', '4' (not shown) and so on until either the requesting device is found or there are no more devices to address, in which case the controlling device may maintain permission to transmit data across the link 110 at 316. Alternatively, other methods for determining the requesting device, which may be implemented by hardware, software, firmware or any combination thereof, may be implemented by the controlling device. Other methods, including, but not limited to methods which guarantee priority for certain devices when they are the requesting device will be familiar to one who is skilled in the art.

When the requesting device is found by the controlling device, the controlling device may handoff the permission to transmit data on the link 110 to the requesting device at 314. Again, techniques for transferring the control of the data link should also be well known to one skilled in the art. One skilled in the art will find that several handoff techniques may be adequate and equally suitable for implementing the features of the present invention described herein. When the handoff is complete, the new controlling device may be permitted to transmit data on the link 110 at 316.

It should be appreciated that while the present invention may be implemented in many types of electronic devices including radio telephones, personal computers, server computers, hand-held or laptop devices, multiprocessor systems, microprocessor-based systems, set top boxes, programmable consumer electronics, network PCs, minicomputers, mainframe computers and distributed computing environments that include any of the above systems or devices, an exemplary environment for the implementation of the present invention is on a serial communications link that electrically connects embedded CMOS applications microprocessors.

The present invention has been described in relation to particular embodiments, which are intended in all respects to be illustrative rather than restrictive. Alternate embodiments will become apparent to those skilled in the art to which the present invention pertains without departing from its spirit and scope. Accordingly, the scope of the present invention is to be limited only by the claims below.

We claim:

1. In a system comprising a first embedded device designated as a current controlling device and a second embedded device among a plurality of embedded devices, the current controlling device configured to permit transmission on a communications link and configured to control a handoff of permission to transmit on the communications link, a method comprising:

transmitting a first request from the second embedded device to the current controlling device, the first request indicative of the second embedded device requesting permission to transmit data on the communications link, the first request initiating the handoff that transfers control from the current controlling device to the second embedded device to permit transmission on the communications link; and receiving, by the second embedded device from the current controlling device, permission to transmit on the communications link and control of the handoff of permission to transmit on the communications link based on the first request, wherein, after receiving permission from the current controlling device, the second embedded device is designated as a new current controlling device, the new current controlling device is operable to receive a second request for a handoff from another embedded device of the plurality of embedded devices and to decide whether to grant the second request.

2. The method of claim 1, wherein the first and the second requests to transmit data on the communications link are asserted by activating a link request pin.

3. The method of claim 1, further comprising determining an identity of the second embedded device and an identity of the another embedded device that asserted the first request and the second request, respectively, based on addressing one of the plurality of embedded devices and determining whether the addressed device has asserted a confirmation signal.

4. The method of claim 3, wherein the current controlling device and the new current controlling device address the plurality of embedded devices by a round-robin method.

5. The method of claim 3, wherein the confirmation signal is asserted by activating a wait pin, the wait pin being for data flow control, wherein activation of the wait pin indicates a stop of data acceptance.

6. The method of claim 1, wherein the plurality of embedded devices includes at least one baseband processor device.

7. The method of claim 1, wherein the plurality of embedded devices includes a general purpose processor device.

8. The method of claim 1, wherein the plurality of embedded devices is in a radio telephone.

9. The method of claim 1, wherein the current controlling device is operable to transmit data on the communications link while receiving the first request to transmit data on the communications link and the new current controlling device is operable to transmit data on the communications link when receiving the second request to transmit data on the communications link.

10. The method of claim 1, wherein the current controlling device is operable to determine whether to handoff permission to transmit data on the communications link to the second embedded device and the new current controlling device is operable to determine whether to handoff permission to transmit data on the communications link to the another embedded device.

11. The method of claim 1, wherein the communications link accommodates a data rate of at least one hundred megabits per second.

12. A system comprising:

a first embedded device among a plurality of embedded devices, the first embedded device designated as a current controlling device;

a communications link coupling the current controlling device to a second embedded device among the plurality of embedded devices, wherein the current controlling device is configured to permit transmission on the communications link and to control a handoff of permission to transmit data on the communications link; and a link request pin electrically coupling the plurality of embedded devices, the second embedded device operable to request permission to transmit data on the communications link based on the transmission a first request to the current controlling device via an activation of the link request pin, the first request initiating the handoff that transfers control from the current controlling device to the second embedded device to permit transmission on the communications link, wherein the second embedded device receives, from the current controlling device, permission to transmit on the communications link and control of the handoff of permission to transmit on the communications link based on the first request, wherein the second embedded device, after receiving permission from the current controlling device, is designated as a new current controlling device, the new current controlling device is operable to receive a second request for a handoff from another embedded device of the plurality of embedded devices and to decide whether to grant the second request.

13. The system of claim 12, wherein the current controlling device and the new current controlling device are operable to determine which of the plurality of embedded devices is requesting permission to transmit data on the communications link.

14. The system of claim 12, wherein each of the plurality of embedded devices comprises a confirmation pin to confirm requests to transmit data on the communications link.

15. The system of claim 14, wherein the current controlling device and the new current controlling device are operable to address one of the plurality of embedded devices and determine whether the addressed embedded device has asserted the confirmation pin.

16. The system of claim 15, wherein the current controlling device and the new current controlling device are operable to address the plurality of embedded devices by a round-robin method.

17. The system of claim 12, wherein the plurality of embedded devices includes at least one baseband processor device.

18. The system of claim 17, wherein the at least one baseband processor device comprises a CDMA processor, WCDMA processor, Bluetooth processor, or IEEE 802.11 processor.

19. The system of claim 12, wherein the plurality of embedded devices includes a general purpose processor device.

20. The system of claim 12, wherein the plurality of embedded devices is in a radio telephone.

21. The system of claim 12, wherein the current controlling device is operable to transmit data on the communications link while receiving the first request to transmit data on the communications link and the new current controlling device is operable to transmit data on the communications link while receiving the second request to transmit data on the communications link.

22. The system of claim 21, wherein the current controlling device is operable to determine whether to handoff permission to transmit data on the communications link to the second embedded device and the new current controlling device is operable to determine whether to handoff permission to transmit data on the communications link to the another embedded device.

23. In a system comprising a first embedded device designated as a current controlling device and a second embedded device among a plurality of embedded devices, the current controlling device configured to permit transmission on a communications link and configured to control a handoff of permission to transmit on the communications link, a method comprising:

transmitting a first link request signal from the second embedded device to the current controlling device, the first link request signal indicative of the second embedded device requesting permission to transmit data on a communications link, the first link request signal initiating the handoff that transfers control from the current controlling device to the second embedded device to permit transmission on the communications link; and receiving, by the second embedded device from the current controlling device, permission to transmit on the communications link and control of the handoff of permission to transmit on the communications link based on the first link request signal, wherein, after receiving permission from the current controlling device, the second embedded device is designated as a new current controlling device, the new current controlling device is operable to receive a second link request signal for a handoff from another embedded device of the plurality of embedded devices and to decide whether to grant the second link request.

24. The method of claim 23 further comprising performing an arbitration to determine an identity of the second embedded device that asserted the first link request signal wherein the arbitration comprises addressing the plurality of embedded devices by a round-robin method.

25. A system comprising:

first embedded processing means among a plurality of embedded processing means for processing data, the first embedded processing means designated as a current controlling;

second embedded processing means of the plurality of embedded processing means; and communications means, coupling the plurality of embedded processing means, for transmitting data wherein the current controlling means permits transmission on the communication means and controls a handoff of permission to transmit data on the communications means, wherein the second embedded processing means is operable to request permission to transmit data on the communication means based on the transmission of a first request to the current controlling means, the first request initiating the handoff that transfers control from the current controlling means to the second embedded processing means to permit transmission on the communications means, wherein the second embedded means receives from the current controlling means permission to transmit on the communications means and control of the handoff of permission to transmit on the communication means based on the first request, and wherein the second embedded processing means, after receiving permission from the current controlling means, is designated as new current controlling means for receiving a second request for a handoff from another embedded processing means of the plurality of embedded processing means and for deciding whether to grant the second request.

26. The system of claim 25, wherein the current controlling means and the new current controlling means are operable to determine which of the plurality of embedded processing means is requesting permission to transmit data on the communications means.

27. The system of claim 25, wherein each of the plurality of embedded processing means comprises confirmation means for confirming a requests to transmit data on the communications means.

28. The system of claim 27, wherein the current controlling means and the new current controlling means are operable to address one of the plurality of embedded processing means and determine whether the addressed embedded processing means has asserted the confirmation means.

29. The system of claim 28, wherein the current controlling means and the new current controlling means are operable to address the plurality of embedded processing means by a round-robin method.

30. The system of claim 25, wherein the plurality of embedded processing means includes at least one baseband processing means.

31. The system of claim 25, wherein the plurality of embedded processing means includes at least one general purpose processing means.

32. The system of claim 25, wherein the plurality of embedded processing means is in a radio telephone.

33. The system of claim 25, wherein the current controlling means is operable to transmit data on the communications means while receiving the first request to transmit data on the communications means and the new current controlling means is operable to transmit data on the communications means while receiving the second request to transmit data on the communications means.

34. The system of claim 25, wherein the current controlling means is operable to determine whether to handoff permission to transmit data on the communications means to the second embedded processing means and the new current controlling means is operable to determine whether to handoff permission to transmit data on the communications means to the another embedded processing means.

35. In a system comprising a first embedded device designated as a current controlling device and a second embedded device among a plurality of embedded devices, the current controlling device configured to permit transmission on the communications link and configured to control a handoff of permission to transmit on the communications link, a method comprising:

receiving a first request at the current controlling device from the second embedded device, the first request indicative of the second embedded device requesting permission to transmit data on the communications link, the first request initiating the handoff that transfers control from the current controlling device to the second embedded device to permit transmission on the communications link; and transmitting, from the current controlling device to the second embedded device, permission to transmit on the communications link and control of the handoff of permission to transmit on the communications link based on the first request, wherein, after receiving permission from the current controlling device, the second embedded device is designated as a new current controlling device, the new current controlling device is operable to receive a second request for a handoff from another embedded device of the plurality of embedded devices and to decide whether to grant the second request.

36. The method of claim 35, wherein the first and second requests to transmit data on the communications link are asserted by activating a link request pin.

37. The method of claim 35, further comprising determining an identity of the second embedded device and an identity of the another embedded device that asserted the first request and the second request, respectively, based on addressing one of the plurality of embedded devices and determining whether the addressed device asserted a confirmation signal.

38. The method of claim 37, wherein the current controlling device and the new current controlling device address the plurality of embedded devices by a round-robin method.

39. The method of claim 37, wherein the confirmation signal is asserted by activating a wait pin.

40. The method of claim 35, wherein permission to transmit data on the communications link includes an ability to exclusively transmit data on the communications link.

41. A system comprising:

a first embedded device among a plurality of embedded devices, the first embedded device designated as a current controlling device that is configured to permit transmission on a communications link and to control a handoff of permission to transmit on the communications link;

a link request pin electrically coupling the plurality of embedded devices, wherein a second embedded device of the plurality of embedded devices operable to request permission to transmit data on the communications link based on the transmission of a first request to the current controlling device via an activation of the link request pin, the first request initiating the handoff that transfers control from the current controlling device to the second embedded device to permit transmission on the communications link, wherein the second embedded device receives, from the current controlling device, permission to transmit on the communications link and control of the handoff of permission to transmit on the communications link based on the first request, wherein the second embedded device, after receiving permission from the current controlling device, is designated as a new current controlling device, the new current controlling device is operable to receive a second request for a handoff from another embedded device of the plurality of embedded devices and to decide whether to grant to the second request.

42. The system of claim 41, wherein each of the plurality of embedded devices comprises a confirmation pin to confirm requests to control the communications link.

43. The system of claim 42, wherein the current controlling device and the new current controlling device are operable to address a one of the plurality of embedded devices and determine whether the addressed embedded device has asserted the confirmation pin.

44. The system of claim 41, wherein permission to transmit data on the communications link includes an ability to exclusively transmit data on the communications link.

45. In a system comprising a first embedded device designated as a current controlling device and a second embedded device among a plurality of embedded devices, the current controlling device configured to permit transmission on a communications link and configured to control a handoff of permission to transmit on the communications link, a method comprising:

receiving a first link request signal at the current controlling device from the second embedded device, the first link request signal indicative of the second embedded device requesting permission to transmit data on the communications link, the first link request signal initiating the handoff that transfers control from the current controlling device to the second embedded device to permit transmission on the communications link;

receiving a confirmation signal at the current controlling device from the second embedded device, thereby confirming that the second embedded device initiated the first link request signal; and transferring, from the current controlling device to the second embedded device, permission to transmit on the communications link and control of the handoff of permission to transmit on the communications link, wherein, after receiving permission from the current controlling device, the second embedded device is designated as a new current controlling device, the new current controlling device is operable to receive a second link request signal for a handoff from another embedded device of the plurality of embedded devices and to decide whether to grant the second request.

46. The method of claim 45, wherein permission to transmit data on the communications link includes an ability to exclusively transmit data on the communications link.

47. The method of claim 45 further comprising performing an arbitration to determine which one of the plurality of embedded devices initiated the link request signal, the arbitration comprising addressing the plurality of embedded devices by a round-robin method.

48. A system comprising:

first embedded processing means among a plurality of embedded processing means for processing data, the first embedded processing means designated as current controlling means for permitting transmission on communication means for coupling the plurality of embedded processing means and for controlling a handoff of permission to transmit on the communications means; and second embedded processing means of the plurality of embedded processing means, wherein the second embedded processing means is operable to request permission to transmit data on the communication means based on the transmission of a first request to the current controlling means, the first request initiating the handoff that transfers control from the current controlling means to the second embedded processing means to permit transmission on the communications means, wherein the second embedded processing means receives from the current controlling means permission to transmit on the communications means and control of the handoff of permission to transmit on the communication means based on the first request, wherein the second embedded processing means, after receiving permission from the current controlling means, is designated as new current controlling means for receiving a second request for a handoff from another embedded processing means of the plurality of embedded processing means and for deciding whether to grant the second request.

49. The system of claim 48, wherein each of the plurality of embedded processing means comprises confirmation means for confirming a request for permission to transmit data on the communications means.

50. The system of claim 49, wherein the current controlling means and the new current controlling means are operable to address one of the plurality of embedded processing means and determine whether the addressed embedded processing means has asserted the confirmation means.

51. The system of claim 48, wherein permission to transmit data on the communications means includes an ability to exclusively transmit data on the communications means.

* * * * *